(12) United States Patent
Jones et al.

(10) Patent No.: US 8,153,981 B2
(45) Date of Patent: Apr. 10, 2012

(54) RADIATION DETECTOR ASSEMBLY

(75) Inventors: Keith D. Jones, Macedonia, OH (US);
Audry M. Alabiso, Sagamore Hills, OH (US)

(73) Assignee: General Electric Company, Schenectady, NY (US)

( * ) Notice: Subject to any disclaimer, the term of this patent is extended or adjusted under 35 U.S.C. 154(b) by 683 days.

(21) Appl. No.: 12/365,557

(22) Filed: Feb. 4, 2009

(65) Prior Publication Data

US 2010/0193693 A1    Aug. 5, 2010

(51) Int. Cl.
*G01V 5/00*    (2006.01)
(52) U.S. Cl. .................................. 250/361 R
(58) Field of Classification Search ............... 250/361 R
See application file for complete search history.

(56) References Cited

U.S. PATENT DOCUMENTS 6,657,199 B2    12/2003    Frederick et al.
7,170,061 B2    1/2007    Clarke et al.

*Primary Examiner* — David Porta
*Assistant Examiner* — Carolyn Igyarto
(74) *Attorney, Agent, or Firm* — Greg Strugalski; Ernest G. Cusick; Frank A. Landgraff

(57) ABSTRACT

A radiation detector assembly comprises a radiation scintillator detector for generating a light signal as a function of radiation detected. A light detector is operatively connectable with the radiation scintillator detector for receiving a light signal from the radiation scintillation detector and generating an electrical signal as a function of the light signal received. A housing for the light detector is electrically connectable with the light detector. At least one of the housing and the light detector is electrically connectable with a pole of a power supply whereby the housing and the light detector are at substantially the same electrical potential when electrically connected.

20 Claims, 3 Drawing Sheets

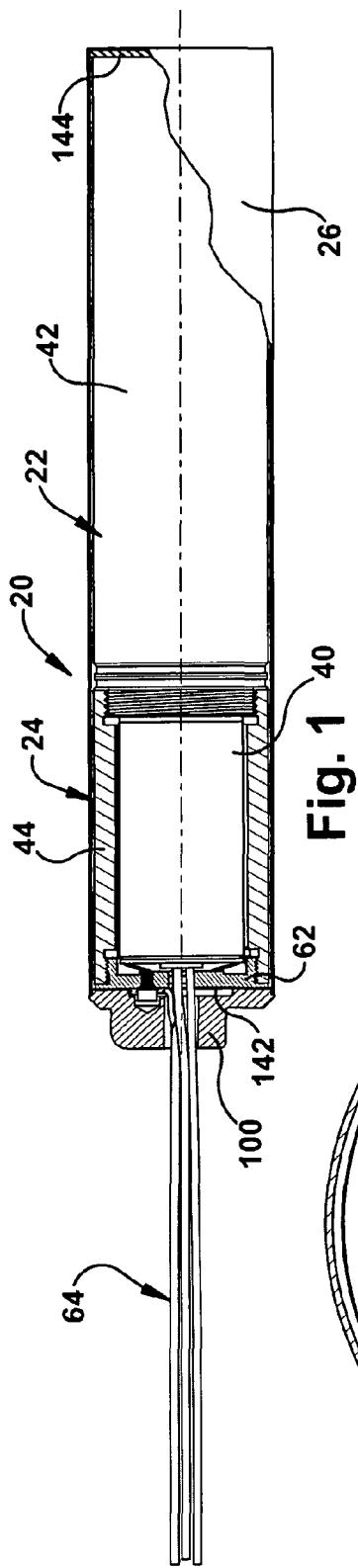
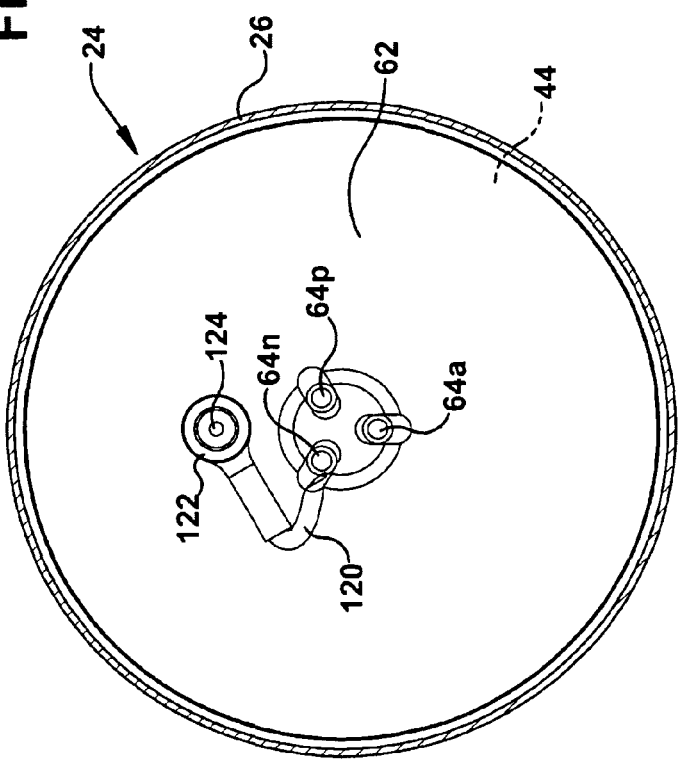

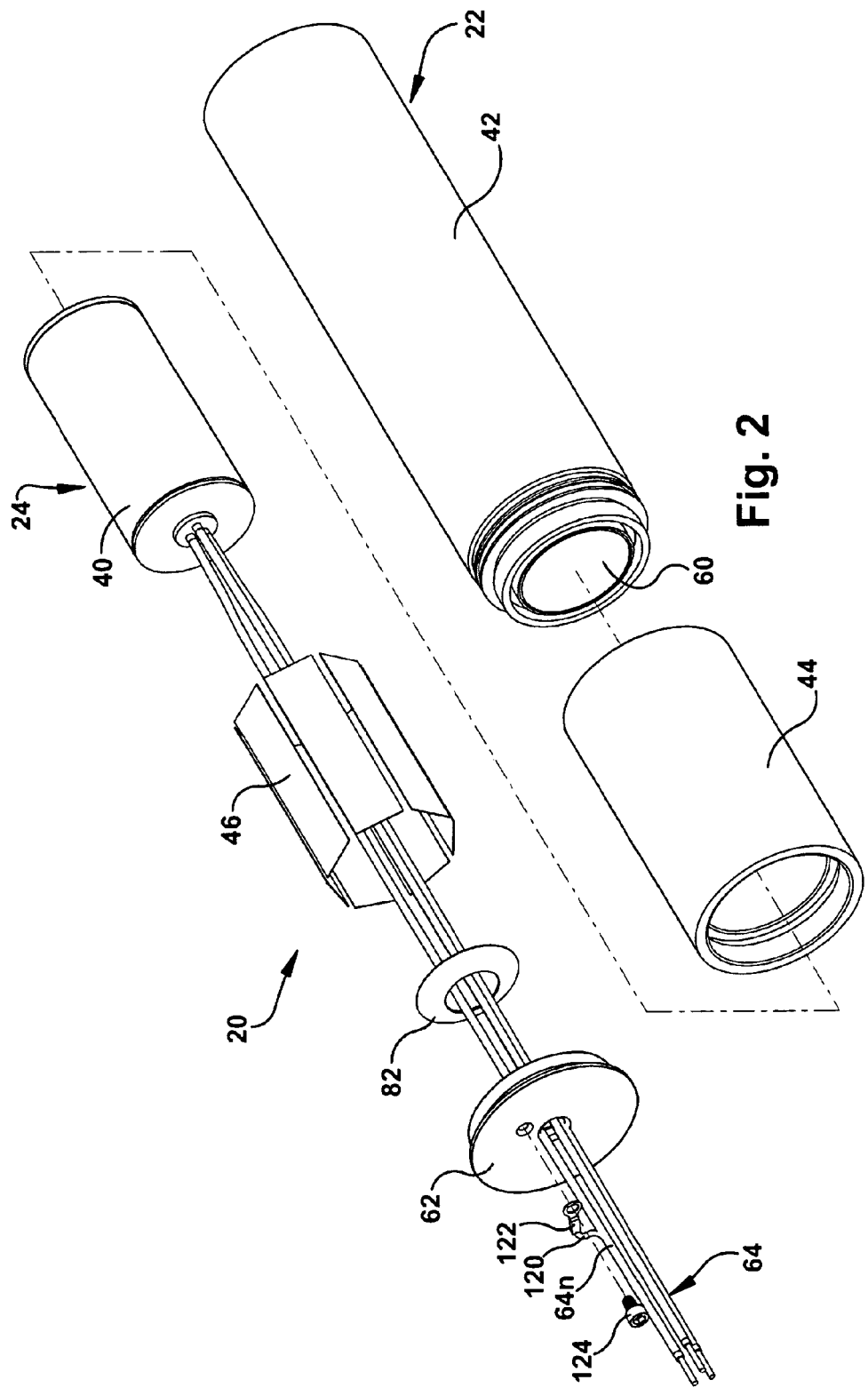

RADIATION DETECTOR ASSEMBLY

BACKGROUND OF THE INVENTION

The invention relates generally to radiation detectors. In particular, the invention relates to radiation scintillator detectors.

Radiation scintillator detectors are known in the well drilling industry for logging and measure while drilling (MWD) applications. Radiation scintillator detectors may also be used as security portal detectors or in medical applications. When the radiation scintillator detector is incorporated into a logging tool of a tool string used for the drilling of oil, gas and water wells, the logging tool identifies, locates and differentiates geologic formations along a well bore. Tool strings and logging tools for oil wells are often exposed to harsh operating environments including temperatures that can reach 185° C. and pressures up to 20,000 psi and can be exposed to severe shock and vibration.

A typical radiation detector assembly includes a scintillator coupled to a light detecting element such as a photomultiplier tube. Radiation, such as gamma rays emitted by geologic formations, is converted to light by the scintillator and conducted to the photomultiplier tube. The photomultiplier tube converts the light into electrons and produces an amplified electrical signal. The amplified electrical signal is then measured and used by monitoring electronics. It is desirable to have the amplified electrical signal produced by the photomultiplier tube, in the absence of noise, to be directly proportional to the gamma rays interacting in the scintillator that are converted to light.

Any "noise" component in the amplified electrical signal could lead to a misrepresentation of the gamma rays reacting in the scintillator. "Noise" or dark current, in the form of an electrons produced in the photomultiplier tube, can be created by thermal activity and not by a photoelectric effect. These electrons are known as thermionic electrons. The amplified electrical signal produced in the photomultiplier tube that include thermionic electrons, could misrepresent or distort the signal created by gamma rays deposited in, reacting or interacting with the scintillator. Operating the photomultiplier tube at high temperatures increases the emission thermionic electrons and noise levels. For certain applications, such as in downhole drilling, an accurate measure of a geologic formation's background radiation is required and spurious electron production from "noise" can affect the performance of the radiation detector assembly. It is, therefore, advantageous to eliminate or minimize the "noise" component in the radiation detector assembly.

BRIEF DESCRIPTION OF THE INVENTION

One aspect of the invention is a radiation detector assembly that produces less "noise" than previously known. The radiation detector assembly comprises a radiation scintillator detector for generating a light signal as a function of radiation detected. A light detector is operatively connectable with the radiation scintillator detector for receiving a light signal from the radiation scintillation detector and generating an electrical signal as a function of the light signal received. A housing for the light detector is electrically connectable with the light detector. At least one of the housing and the light detector is electrically connectable with a pole of a power supply whereby the housing and the light detector are at substantially the same electrical potential when electrically connected.

Another aspect of the invention is a radiation detector assembly comprising a crystal assembly for generating a signal indicative of a scintillation event. A photomultiplier tube assembly is operably and electrically connectable with the crystal assembly. The photomultiplier tube assembly is for receiving the signal from the crystal assembly and generating an electrical signal as a function of the signal received. The photomultiplier tube assembly comprises a housing for supporting a photomultiplier tube. The housing is electrically connectable with the photomultiplier tube. The housing and the photomultiplier tube are at substantially the same electrical potential when electrically connected to minimize the production of thermionic electrons in the photomultiplier tube.

Yet another aspect of the invention is a photomultiplier tube assembly comprising a photomultiplier tube for receiving a light signal from a source. The photomultiplier tube generates an electrical signal as a function of the light signal received. A housing supports the photomultiplier tube. The housing is electrically connectable with the photomultiplier tube. At least one of the housing and the photomultiplier tube is electrically connectable with a pole of a power supply. The housing and photomultiplier tube are at substantially the same electrical potential when electrically connected.

DESCRIPTION OF THE DRAWINGS

These and other features, aspects, and advantages of the invention will be better understood when the following detailed description is read with reference to the accompanying drawings, in which:

FIG. 1 is a side elevation view illustrating a radiation detector assembly according to one aspect of the invention;

FIG. 2 is an exploded perspective view illustrating a portion of the radiation detector assembly shown in FIG. 1;

FIG. 4 is a view of an end portion of the radiation detector assembly, taken approximately along line 4-4 of FIG. 1.

DETAILED DESCRIPTION OF THE INVENTION

Figure 3:
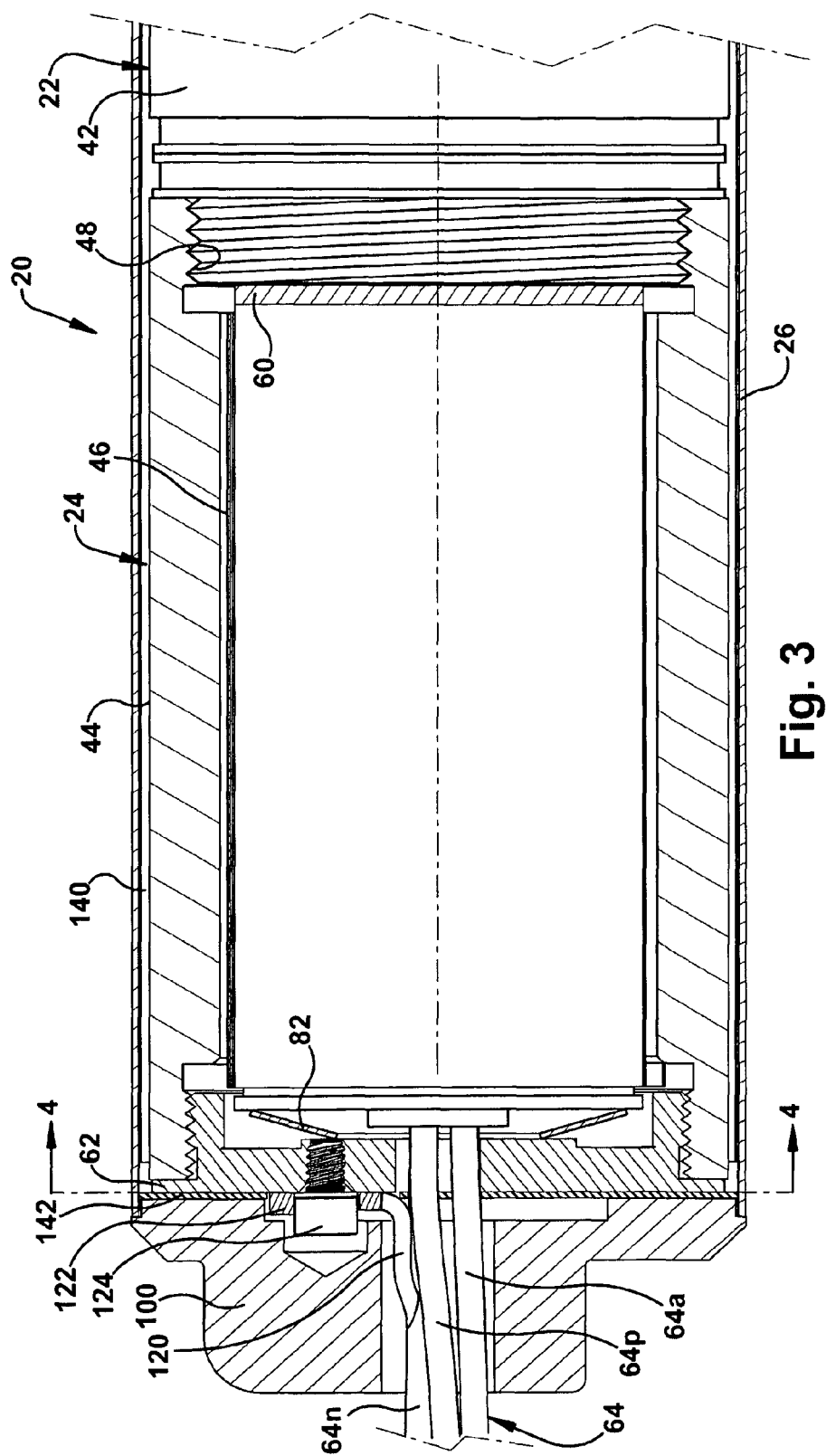
FIG. 3 is an enlarged cross-sectional view of the radiation detector assembly illustrated in FIG. 1.

A radiation detector assembly 20 according to one aspect is illustrated in FIGS. 1-3. The radiation detector assembly 20 may be used for detecting and measuring levels or energies of gamma radiation from various sources and in various applications. The radiation detector assembly 20 includes two major operating devices, a radiation scintillator detector assembly 22 and a photomultiplier tube assembly 24. The radiation detector assembly 20 also includes an outer housing 26 to protect the radiation scintillator detector assembly 22 and the photomultiplier tube assembly 24.

The radiation scintillator detector 22 has a crystal (not shown) for generating a signal indicative of a scintillation event, such as when radiation of a certain level or energy is detected. For example, radiation, such as gamma rays, is converted to light by the crystal scintillator of the radiation scintillator detector 22 as a function of the radiation detected. The radiation scintillator detector 22 may include other devices capable of scintillation from radiation. For example, the crystal may be a cylindrical sodium iodide crystal doped with thallium (NaI(Tl)). Also by way of example, the crystal may have a diameter of one inch and may be up to five inches in length.

The crystal of the radiation scintillator detector 22 generates a light signal as a function of radiation detected by some of the radiation interacting with the crystal, as is known. For example, the light signal is generated as a function of the presence and amount of gamma radiation delivered to the radiation scintillator detector 22. The radiation scintillator detector 22 further includes a housing 42 for supporting a crystal. The housing 42 may be made of any suitable material, such as titanium, prepared aluminum or stainless steel. The radiation scintillator detector 22 may also include support structure located between the housing 42 and the crystal.

The photomultiplier tube assembly 24 is operably and electrically connected to the crystal of the radiation scintillator detector 22. The photomultiplier tube assembly 24 receives the light signal from the crystal and generates an electrical signal as a function of the light signal received. The photomultiplier tube assembly 24 includes a photomultiplier tube 40 (FIG. 1), as is known, that includes a photo detector to receive the light signal from the crystal of the radiation scintillator detector 22.

The photomultiplier tube assembly 24 may be any of several known photomultiplier tube assemblies. In the illustrated example, the photomultiplier tube assembly 24 has an outer diameter substantially identical to that of the radiation scintillator detector 22.

The photomultiplier tube assembly 24 includes a housing 44 that supports the photomultiplier tube 40. The housing 44 may be made of any suitable material, such as titanium, prepared aluminum or stainless steel. The photomultiplier tube assembly 24 may also include support structure 46 (FIG. 2) in the form of spring material. The photomultiplier tube assembly 24 includes a resistive divider to bias the photomultiplier tube (not shown). The photomultiplier tube assembly 24 is attached to the radiation scintillator detector 22 at threaded connection 48 (FIG. 3).

An optical window 60, located between the photomultiplier tube assembly 24 and the radiation scintillator detector 22, allows light from scintillation formed in the radiation scintillator detector to pass into the photomultiplier tube assembly. Amplified electrical pulses are produced at an anode of the photomultiplier tube 40. The amplified pulses or electrical signals are then conducted through wires 64 to processing electronics.

The photomultiplier tube 40 is protected from the operating environment by the housing 44 that is rigid. The photomultiplier tube assembly 24 includes a cap 62 that is threaded into an axial end of the photomultiplier tube housing 44 to close one end of the housing. The cap 62 may be made of any suitable material, such as titanium, prepared aluminum or stainless steel. The other axial end of the photomultiplier tube housing 44 is threaded into the open end of the radiation scintillator detector 22 at threaded connection 48 to close the other axial end of the housing and the radiation scintillator detector.

A spring 82 engages the left axial end, as viewed in FIG. 3, of the photomultiplier tube 40 and the right axial interior surface of the cap 62. The spring 82 is electrically conductive and made from a material such as metal. The spring 82 loads the photomultiplier tube 40 with a known biasing force and provides an electrical connection between the cap 62 and the photomultiplier tube. Potting material, such as RTV, may be placed around the wires 64 extending through the central opening in the cap 62. Thus, the housing 44, the photomultiplier tube 40 and the radiation scintillator detector 22 are electrically connected and exposed to the substantially the same electrical potential. The photomultiplier tube assembly 24 may, thus, be provided as a ready to use component or as a replacement part.

A second outer cap 100 (FIG. 3) may be attached to the outer housing 26 to enclose and protect the photomultiplier tube assembly 24 and the radiation scintillator detector 22. Potting material, such as RTV, may be placed around the wires 64 extending through the opening in the cap 100. The outer cap 100 and the outer housing 26 are electrically insulated from the radiation scintillator detector 22 and the photomultiplier tube assembly 24. Insulating material 140 is located between the outer housing 26 and the photomultiplier tube housing 44 and the radiation scintillator detector housing 42. The insulating material 140 may completely encapsulate the photomultiplier tube housing 44 and the radiation scintillator detector housing 42 or may be discrete strips spaced circumferentially about housings. Insulating material 142 is also located between the cap 62 and the cap 100. The insulating material 142 may also extend to prevent the screw 124 and terminal connector 122 from shorting against the caps 62 and 100. Insulating material 144 is located between the right, as viewed in FIG. 1, axial inner end of the outer housing 26 and the radiation scintillator detector housing 42. The insulating materials 140, 142 and 144 may be any suitable electrically insulating material.

Power is supplied to the photomultiplier tube 40 through the wires 64. Each of the three wires 64 lead to a DC external power source (not shown). The three wires 64 are electrically connected to a ground, negative and positive terminal, respectively, of the power source. A wire end portion 120 is spliced to and extends from a wire 64n of the wires 64. The wire 64n is electrically connected to the negative terminal of the power source. Preferably, the negative terminal of the power source is maintained at a negative voltage of at least 100 volts or more. A terminal connector 122 is attached to the wire end portion 120. The terminal connector 122 is connected to the cap 62 by threaded fastener 124. The wire 64a is electrically connected to the ground terminal of the power source. The wire 64p is electrically connected to the positive terminal of the power source.

The housing 44 for the photomultiplier tube 40 is electrically connected to the radiation scintillator detector 22 at the threaded connection 48. Thus, the housing 44, spring 82, cap 62, photomultiplier tube 40 and radiation scintillator detector 22 are electrically connected together and exposed to the substantially the same electrical potential. Preferably, the potential is at least a negative 100 volts. By electrically connecting the photomultiplier tube 40 to the surrounding metallic housing 44, "noise" created by thermionic electrons is minimized or eliminated. The entire radiation detector assembly 20 will also be at the same polarity and potential as the photomultiplier tube 40.

Thus, one of two components affecting the liberation rate of thermionic electrons in the photomultiplier tube 40, the electric field, is eliminated or at least minimized. The radiation scintillation detection assembly 22 even operating at relatively high temperatures, such as 185° C., with a negative applied high voltage across components of the photomultiplier tube 40 will produce relatively few thermionic electrons. Without the generation of thermionic electrons the "noise" component in amplified electrical the signal produced in the photomultiplier tube 40 is at least decreased and preferably eliminated to improve the performance of the photomultiplier tube 40 and the radiation detector assembly 20. The amplified electrical signal produced by the photomultiplier tube 40, in the absence of "noise", can then properly reflect the energy of the gamma rays deposited in, reacting or interacting with the radiation scintillator detector 22.

While the invention has been described in terms of various specific embodiments, those skilled in the art will recognize that the invention extends beyond the specifically disclosed embodiments to other alternative embodiments and/or uses of the systems, techniques and obvious modifications and equivalents of those disclosed. It is intended that the scope of the invention disclosed should not be limited by the particular disclosed embodiments described above.

What is claimed is:
1. A radiation detector assembly comprising:
    a radiation scintillator detector for generating a light signal as a function of radiation detected;

a light detector operatively connectable with the radiation scintillator detector for receiving a light signal from the radiation scintillation detector and generating an electrical signal as a function of the light signal received; and a housing for the light detector and electrically connected with the light detector;

at least one of the housing and the light detector is electrically connected with a pole of a power supply whereby the housing for the light detector and the light detector are at substantially the same electrical potential.

2. The radiation detector assembly of claim 1 wherein the power supply comprises a DC power supply for providing electrical power to the light detector; and a negative pole of the DC power supply is electrically connectable with at least one of the housing and the light detector whereby the housing for the light detector and the light detector are at substantially the same negative electrical potential.

3. The radiation detector assembly of claim 2 wherein the electrical potential is at least about a negative one hundred volts.

4. The radiation detector assembly of claim 1 further including a housing for the radiation scintillator detector; the housing for the light detector is electrically connectable with the housing for the radiation scintillator detector whereby the housing for the radiation scintillator detector, housing for the light detector and the light detector are at substantially the same electrical potential.

5. The radiation detector assembly of claim 4 wherein the power supply comprises a DC power supply for providing electrical power to the light detector; and the negative pole of the DC power supply is electrically connectable with at least one of the housing and the light detector whereby the housing for the radiation scintillator detector, housing for the light detector and the light detector are at substantially the same negative electrical potential.

6. The radiation detector assembly of claim 5 wherein the electrical potential is at least about a negative one hundred volts.

7. The radiation detector assembly of claim 4 further including:
an outer housing disposed about the housing for the radiation scintillator detector and the housing for the light detector, the outer housing is electrically connectable with at least one of the housing for the light detector and the housing for the radiation scintillator detector whereby the outer housing, housing for the radiation scintillator detector, housing for the light detector and the light detector are at substantially the same electrical potential; and
insulating material located between the outer housing and the at least one of the housing for the light detector and the housing for the radiation scintillator detector.

8. The radiation detector assembly of claim 1 wherein the radiation scintillator detector comprises a crystalline material.

9. The radiation detector assembly of claim 1 wherein the light detector comprises a photomultiplier tube.

10. The radiation detector assembly of claim 1 used to detect radiation emitted from geologic formations along a well bore.

11. A radiation detector assembly comprising:
a crystal assembly for generating a signal indicative of a scintillation event; and
a photomultiplier tube assembly operably and electrically connectable with the crystal assembly and for receiving the signal from the crystal assembly and generating an electrical signal as a function of the signal received; the photomultiplier tube assembly comprising a housing for supporting a photomultiplier tube, and the housing being electrically connected with the photomultiplier tube;

whereby the housing and the photomultiplier tube are at substantially the same electrical potential to minimize the production of thermionic electrons in the photomultiplier tube.

12. The radiation detector assembly of claim 11 wherein at least one of the housing and the photomultiplier tube is electrically connectable with a pole of a power supply whereby the housing and the photomultiplier tube are at substantially the same electrical potential.

13. The radiation detector assembly of claim 12 wherein the power supply comprises a DC power supply for providing electrical power to the photomultiplier tube; and a negative pole of the DC power supply is electrically connectable with at least one of the housing and the photomultiplier tube whereby the housing and the photomultiplier tube are at substantially the same negative electrical potential.

14. The radiation detector assembly of claim 13 wherein the electrical potential is at least about a negative one hundred volts.

15. The radiation detector assembly of claim 11 wherein the crystal assembly further includes a housing for supporting a crystal; the housing for supporting the crystal is electrically connectable with the housing for supporting a photomultiplier tube whereby the housing for supporting the crystal detector, housing for supporting the photomultiplier tube, the photomultiplier tube and the housing for supporting the crystal and are at substantially the same electrical potential.

16. The radiation detector assembly of claim 15 wherein the power supply comprises a DC power supply for providing electrical power to the photomultiplier tube; and a negative pole of the DC power supply is electrically connectable with at least one of the housing for supporting the photomultiplier tube and the photomultiplier tube whereby the housing for supporting the crystal, housing for the photomultiplier tube and the photomultiplier tube are at substantially the same negative electrical potential.

17. The radiation detector assembly of claim 16 wherein the electrical potential is at least about a negative one hundred volts.

18. The radiation detector assembly of claim 15 further including:
an outer housing disposed about the housing for the crystal and the housing for the photomultiplier tube, the outer housing is electrically connectable with at least one of the housing for the photomultiplier tube and the housing for the crystal whereby the outer housing, housing for crystal, housing for the photomultiplier tube and the photomultiplier tube are at substantially the same electrical potential; and
insulating material located between the outer housing and the at least one of the housing for the photomultiplier tube and the housing for the crystal.

19. The radiation detector assembly of claim 18 used to detect radiation emitted from geologic formations along a well bore.

20. A photomultiplier tube assembly comprising:
a photomultiplier tube for receiving a light signal from a source and generating an electrical signal as a function of the light signal received; and
a housing for supporting the photomultiplier tube, and the housing being electrically connected with the photomultiplier tube;
at least one of the housing and the photomultiplier tube is electrically connected with a pole of a power supply whereby the housing and photomultiplier tube are at substantially the same electrical potential.

* * * * *